United States Patent
Ai et al.

(10) Patent No.: US 11,180,427 B2
(45) Date of Patent: Nov. 23, 2021

(54) METHOD FOR PREPARING ORGANIC COMPLEX MICROELEMENT FERTILIZER FOR ENGINEERING WOUND SOIL REMEDIATION AND MICROELEMENT FERTILIZER PREPARED

(71) Applicant: Sichuan University, Sichuan (CN)

(72) Inventors: Xiaoyan Ai, Sichuan (CN); Yingwei Ai, Sichuan (CN); Xiaoqiao Su, Sichuan (CN); Shenghao Ai, Sichuan (CN); Mengke Zhu, Sichuan (CN)

(73) Assignee: Sichuan University, Sichuan (CN)

( * ) Notice: Subject to any disclaimer, the term of this patent is extended or adjusted under 35 U.S.C. 154(b) by 196 days.

(21) Appl. No.: 16/560,817

(22) Filed: Sep. 4, 2019

(65) Prior Publication Data
US 2019/0389787 A1    Dec. 26, 2019

(30) Foreign Application Priority Data
Oct. 22, 2018 (CN) .......... 201811228290.X

(51) Int. Cl.
| | |
|---|---|
| C05G 3/80 | (2020.01) |
| C05F 17/05 | (2020.01) |
| C05D 9/02 | (2006.01) |
| C05F 11/02 | (2006.01) |
| C09K 17/40 | (2006.01) |
| C05C 3/00 | (2006.01) |

(52) U.S. Cl.
CPC .......... *C05G 3/80* (2020.02); *C05C 3/00* (2013.01); *C05D 9/02* (2013.01); *C05F 11/02* (2013.01); *C05F 17/05* (2020.01); *C09K 17/40* (2013.01)

(58) Field of Classification Search
None
See application file for complete search history.

(56) References Cited

U.S. PATENT DOCUMENTS

| | | | | |
|---|---|---|---|---|
| 5,720,793 | A  * | 2/1998 | Kato | C05C 5/04 |
| | | | | 71/16 |
| 2017/0166488 | A1* | 6/2017 | Chaudhry | C05G 3/00 |
| 2019/0315663 | A1* | 10/2019 | Wan | C05B 7/00 |
| 2019/0315664 | A1* | 10/2019 | Zhang | C05G 5/30 |
| 2019/0359534 | A1* | 11/2019 | Zhang | C05C 9/00 |

FOREIGN PATENT DOCUMENTS

| | | | | |
|---|---|---|---|---|
| CN | 107337554 A | * | 11/2017 | ......... C05D 9/00 |
| CN | 107673900 A | * | 2/2018 | ......... C05B 15/00 |
| CN | 107926555 A | * | 4/2018 | ......... C05C 11/00 |

* cited by examiner

*Primary Examiner* — Wayne A Langel

(57) ABSTRACT

A method for preparing an organic complex microelement fertilizer for engineering wound soil remediation includes compounding chitosan oligosaccharide or/and earthworm dung or/and silkworm sand, water or/and hydrogen peroxide, an organic complex trace element solution, polyethylene glycol octyl phenyl ether, and polysorbate under certain conditions. The present invention can significantly improve physical and chemical properties of engineering wounds, enhance effectiveness of trace elements in soil, and prevent plant physiological diseases due to lack of trace elements, and promote plant growth and development.

2 Claims, No Drawings

METHOD FOR PREPARING ORGANIC COMPLEX MICROELEMENT FERTILIZER FOR ENGINEERING WOUND SOIL REMEDIATION AND MICROELEMENT FERTILIZER PREPARED

CROSS REFERENCE OF RELATED APPLICATION

The present invention claims priority under 35 U.S.C. 119(a-d) to CN 201811228290.X, filed Oct. 22, 2018.

BACKGROUND OF THE PRESENT INVENTION

Field of Invention

The present invention relates to a fertilizer, and most particularly related to a method for preparing an organic complex microelement fertilizer for engineering wound soil remediation and the corresponding microelement fertilizer prepared.

Description of Related Art

The rapid development of infrastructure such as roads, railways, and water conservancy has produced a large number of engineering wounds which have changed the original topography and destroyed the original natural soil and vegetation. Engineering wounds affect both the safety of the infrastructure and the deterioration of the natural environment, requiring timely ecological restoration. Soil remediation of engineering wounds is the basis for vegetation restoration of engineering wounds and the main task of ecological restoration of engineering wounds. For engineering wounds with very special habitats, soil remediation measures that use soil to pile up on engineering wounds and carry out vegetation reconstruction in a specific way are effective ways for modern engineering wound management and ecological greening (as shown in Chinese patent ZL 200810046488.6, and Chinese patent ZL 201510620706.2). Trace elements are essential for plants. The application of microelement fertilizers is a fundamental measure to improve soil fertility and ensure the supply of trace elements in plants. However, due to the lack of targeted and effective organic complex microelement fertilizers, the common microelement fertilizers purchased on the market for farmland soil are still used in the process of soil remediation in engineering wounds, wherein the fertilizers are unreasonably used, the nutrient supply is not coordination, fertilizer utilization rate is low, and other production problems are raised. As a result, the effect of soil fertility and vegetation restoration on engineering wounds is not obvious.

SUMMARY OF THE PRESENT INVENTION

An object of the present invention is to provide a method for preparing an organic complex microelement fertilizer for engineering wound soil remediation and the microelement fertilizer prepared, so as to overcome shortcomings of the prior art. The present invention has characteristics of easily available raw materials, low production cost, stable performance, long-lasting fertilizer effect and high biological effectiveness. The present invention can significantly improve physical and chemical properties of engineering wounds, enhance effectiveness of trace elements in soil, and prevent plant physiological diseases due to lack of trace elements, and promote plant growth and development.

Accordingly, in order to accomplish the above objects, the present invention provides a method for preparing an organic complex microelement fertilizer for engineering wound soil remediation, comprising steps of:

(1) putting at least one of 30 wt %-70 wt % chitosan oligosaccharide, earthworm dung and silkworm sand into a reaction kettle, and adding at least one of 30 wt %-70 wt % water and hydrogen peroxide for dissolution, then stirring at 30-90° C. for 0.3-2 hours to obtain a sample 1;

(2) putting at least one of 15 wt %-40 wt % tartaric acid, humic acid, lysine and thioglycolic acid into the reaction kettle, and adding at least one of 30 wt %-65 wt % water and hydrogen peroxide for dissolution, then adding at least one of 5 wt %-35 wt % acetamide, diglycolamine, urea and ethanolamine for dissolution, and stirring at 30-90° C. for 0.2-3 hours to obtain a sample 2;

(3) adding 10 wt %-40 wt % borax, 10 wt %-40 wt % zinc sulfate, 10 wt %-40 wt % ferrous sulfate, 5 wt %-35 wt % copper sulfate, 1 wt %-30 wt % manganese sulfate, 0.5 wt %-15 wt % ammonium molybdate in the reaction kettle, and adding 25 wt %-60 wt % the sample 2, then complexing at 75-130° C. for 0.5-5 hours to obtain a sample 3; and (4) compounding 5 wt %-25 wt % the sample 1, 70 wt %-90 wt % the sample 3, 0 wt %-5 wt % polyethylene glycol octyl phenyl ether, and 0 wt %-6 wt % polysorbate to obtain a final product.

An organic complex microelement fertilizer prepared by the above method for engineering wound soil remediation, comprising: a sample 1, a sample 3, polyethylene glycol octyl phenyl ether and polysorbate; wherein the sample 1 comprises at least one of chitosan oligosaccharide, earthworm dung and silkworm sand, and at least one of water and hydrogen peroxide; the sample 3 comprises at least one of tartaric acid, humic acid, lysine and thioglycolic acid; at least one of water and hydrogen peroxide, at least one of acetamide, diglycolamine, urea and ethanolamine, borax, zinc sulfate, ferrous sulfate, copper sulfate, manganese sulfate and ammonium molybdate.

The present invention has the following beneficial effects:

The present invention overcomes the deficiencies of the prior art, and has the characteristics of easily available raw materials, low production cost, stable performance, long-lasting fertilizer effect and high biological effectiveness. The present invention can significantly improve physical and chemical properties of engineering wounds, enhance effectiveness of trace elements in soil, and prevent plant physiological diseases due to lack of trace elements, and promote plant growth and development.

DETAILED DESCRIPTION OF THE PREFERRED EMBODIMENT

Referring to embodiments, the present invention will be further illustrated.

Embodiment 1

Putting 50 wt % chitosan oligosaccharide into a reaction kettle, and adding 50 wt % water for dissolution, then stirring at 80° C. for 0.5 hours to obtain a chitosan oligosaccharide solution; putting 25 wt % tartaric acid into the reaction kettle, and adding a 40 wt % water for dissolution, then adding 35 wt % diglycolamine for dissolution, and stirring at 80° C. for 0.5 hours to obtain a tartaric acid mixed solution; adding 15 wt % borax, 13 wt % zinc sulfate, 10 wt % ferrous sulfate, 5 wt % copper sulfate, 5 wt % manganese sulfate, 2 wt % ammonium molybdate in the reaction kettle, and adding 50 wt % the tartaric acid mixed solution, then complexing at 100° C. for 1 hours to obtain an organic complex trace element solution; and compounding 10 wt % the chitosan oligosaccharide solution, 85 wt % the organic complex trace element solution, 2 wt % polyethylene glycol octyl phenyl ether, and 3 wt % polysorbate to obtain a final product.

The obtained organic complex microelement fertilizer of the present invention was applied to engineering wound soil remediation, and vegetation restoration comparison experiment was carried out by using Elymus. The comparison experiment showed that compared with COMPO complex microelement fertilizer (developed by COMPO GmbH, Germany) and a control group without fertilizer, the organic complex microelement fertilizer of the present invention can promote the growth and development of Elymus and significantly increase the chlorophyll content of Elymus. The proportion of yellowing seedlings caused by iron deficiency of Elymus was reduced to achieve good vegetation recovery effect (see Table 1).

TABLE 1

Effect of organic complex microelement fertilizer of the present invention on growth and development of *Elymus* in engineering wounds

| Treatment | Plant height (cm) | Chlorophyll content (mg/cm$^2$) | yellowing seedling proportion (%) | Vegetation coverage (%) |
|---|---|---|---|---|
| Control group without fertilizer | 85 | 0.031 | 63.2 | 91 |
| purchased complex microelement fertilizer (COMPO complex microelement fertilizer) | 87 | 0.043 | 28.5 | 96 |
| organic complex microelement fertilizer of the present invention | 90 | 0.059 | 6.3 | 100 |

Embodiment 2

The procedure during preparation is the same as those in embodiment 1. However, type, quantity and dissolution temperature of the raw materials, stirring time, and complexation time are changed within the range specified by the operating procedure of the present invention. As a result, the organic complex microelement fertilizer for engineering wound soil remediation of the present invention is also prepared.

What is claimed is:

1. A method for preparing an organic complex microelement fertilizer for engineering wound soil remediation, comprising steps of:
   (1) putting 30 wt %-70 wt % material A into a reaction kettle, wherein the material A is selected from a group consisting of chitosan oligosaccharide, earthworm dung and silkworm sand; and adding 30 wt %-70 wt % material B for dissolution, wherein the material B is selected from a group consisting of water and hydrogen peroxide; then stirring at 30-90° C. for 0.3-2 hours to obtain a sample 1;
   (2) putting 15 wt %-40 wt % material C into the reaction kettle, wherein the material C is selected from a group consisting of tartaric acid, humic acid, lysine and thioglycolic acid; and adding 30 wt %-65 wt % material D for dissolution, wherein the material D is selected from a group consisting of water and hydrogen peroxide; then adding 5 wt %-35 wt % material E for dissolution, wherein the material E is selected from a group consisting of acetamide, diglycolamine, urea and ethanolamine; and stirring at 30-90° C. for 0.2-3 hours to obtain a sample 2;
   (3) adding 10 wt %-40 wt % borax, 10 wt %-40 wt % zinc sulfate, 10 wt %-40 wt % ferrous sulfate, 5 wt %-35 wt % copper sulfate, 1 wt %-30 wt % manganese sulfate, 0.5 wt %-15 wt % ammonium molybdate in the reaction kettle, and adding 25 wt %-60 wt % the sample 2, then complexing at 75-130° C. for 0.5-5 hours to obtain a sample 3; and
   (4) compounding 5 wt %-25 wt % the sample 1, 70 wt %-90 wt % the sample 3, 0 wt %-5 wt % polyethylene glycol octyl phenyl ether, and 0 wt %-6 wt % polysorbate to obtain a final product.

2. An organic complex microelement fertilizer for engineering wound soil remediation, comprising: a sample 1, a sample 3, polyethylene glycol octyl phenyl ether and polysorbate; wherein the sample 1 comprises a material A and a material B, wherein the material A is selected from a group consisting of chitosan oligosaccharide, earthworm dung and silkworm sand, and the material B is selected from a group consisting of water and hydrogen peroxide; the sample 3 comprises a material C, a material D, a material E, borax, zinc sulfate, ferrous sulfate, copper sulfate, manganese sulfate and ammonium molybdate, wherein the material C is selected from a group consisting of tartaric acid, humic acid, lysine and thioglycolic acid, the material D is selected from a group consisting of water and hydrogen peroxide, and the material E is selected from a group consisting of acetamide, diglycolamine, urea and ethanolamine.

\* \* \* \* \*